United States Patent
Nomura (10) Patent No.: US 6,994,153 B2
(45) Date of Patent: Feb. 7, 2006

(54) HEAT DISCHARGER SUITABLE FOR APPLICATION TO HEAT PIPES

(75) Inventor: Takehide Nomura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/231,240

(22) Filed: Aug. 30, 2002

(65) Prior Publication Data

US 2003/0121639 A1 Jul. 3, 2003

(30) Foreign Application Priority Data

Dec. 28, 2001 (JP) ............................. 2001-399650

(51) Int. Cl.
*F28F 13/18* (2006.01)
(52) U.S. Cl. ............ 165/133; 165/104.21; 165/104.33; 165/185; 165/906; 228/111.5
(58) Field of Classification Search .................. 165/41, 165/104.33, 104.21, 104.26, 47, 185, 133, 165/906; 428/552; 228/111.5
See application file for complete search history.

(56) References Cited

U.S. PATENT DOCUMENTS 5,759,707 A * 6/1998 Belt et al. .................... 428/552

FOREIGN PATENT DOCUMENTS

| JP | 60-49862 | * | 3/1985 | |
|----|----------|---|--------|---|
| JP | 7106479  |   | 4/1995 | |
| JP | 9-42870  | * | 2/1997 | |
| JP | 10-098142| * | 4/1998 | ............ 165/104.33 |

OTHER PUBLICATIONS

Richards, B. P., et al., "An Analysis of the Current Status of Lead-Free Soldering", Jan. 1999.*
Fusion Incorporated, "Paste Brazing & Soldering Alloys", 1996, pp. 1-18 (Document 1).
"Fusion No. 450" (Document 2).
Mitsubishi Electric Corporation, "Satellite-Borne Equipments" (Document 3).

* cited by examiner

*Primary Examiner*—Ljiljana Ciric
(74) *Attorney, Agent, or Firm*—Buchanan Ingersoll PC (57) ABSTRACT

One object of the present invention is to realize a heat discharger having a high precision and in which heat conduction efficiency is maintained at the bonding between the heat pipe and heat sink. A heat discharger comprises a heat pipe and a heat sink formed separately from the heat pipe and bonded to the heat pipe via solder. The contact surface portion between the heat pipe and the solder and the contact surface portion between the heat sink and the solder are made of a wettable material having a wettablility such that the contacting angle with respect to the solder is 90 degrees or less.

8 Claims, 10 Drawing Sheets

HEAT DISCHARGER SUITABLE FOR APPLICATION TO HEAT PIPES

BACKGROUND OF THE INVENTION

1. Field of the Invention

The present invention relates to a heat discharger, and, in particular, to a heat discharger suitable for application in heat pipes intended for artificial space satellites.

2. Description of the Related Art

Most space satellites in earth orbit are provided with a network of heat pipes for conducting heat. Such a network of heat pipes is provided so that the heat locally generated or accumulated, such as absorbed radiant heat from the sun, in one section of the satellite can be conducted through the heat pipes to sections in which heat is not accumulated. Heat sinks for discharging heat are provided for the heat pipes so that the heat conducted via the heat pipes can be radiated away via the heat sinks. The heat pipe and heat sink are integrally formed by extrusion so that the heat from the heat pipe is efficiently conducted to the heat sink.

There has, however, been a tendency for the amount of heat generated by installed electronic equipment to increase as a result of increases in size and complexity of satellites, creating a need to increase the size of the heat sink as a countermeasure against the increased amount of generated heat.

Figure 20:
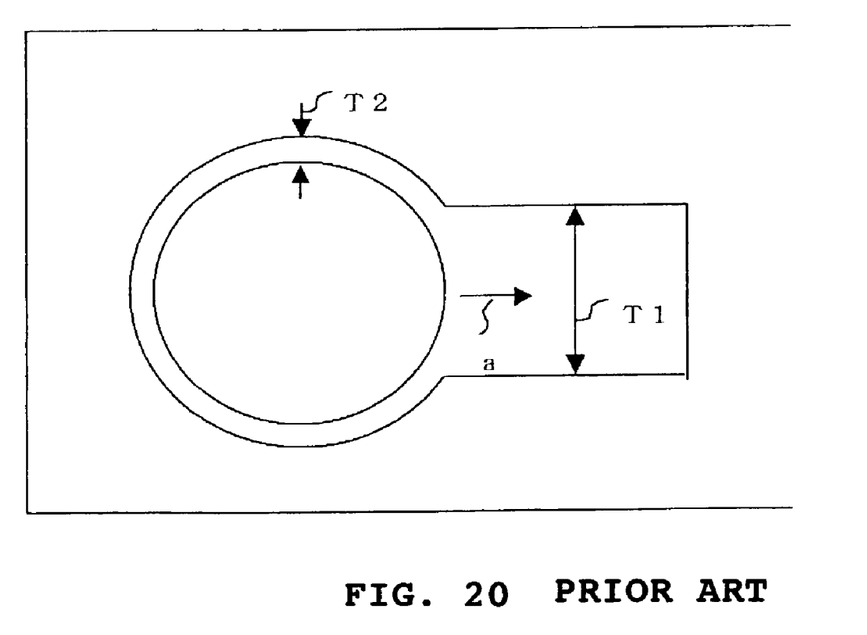
FIG. 20 is a schematic view for explaining integral formation of a heat sink and a heat pipe by extrusion.

However, when the heat sink and heat pipe are integrally formed through extrusion of aluminum, as shown in FIG. 20, if the thickness T1 of the heat sink is equal to or greater than 2.5 times the wall thickness T2 of the heat pipe, the material flows towards the heat sink (shown by an arrow a in FIG. 20) because of the degree of flow of aluminum. Therefore, there had been a problem in that sections corresponding to the heat pipe could not be formed.

To this end, separately forming the heat sink and heat pipe and then welding them together has been proposed in consideration of the heat conduction efficiency. However, because, in order to reduce weight, heat pipe is primarily made of aluminum, application of heat generates strain, making welded aluminum pipe unsuitable for equipment for use in outer space, which requires extremely high precision in assembly.

SUMMARY OF THE INVENTION

The present invention was conceived to solve the problems in the related art and one object of the present invention is to realize a heat discharger having high precision while maintaining heat conduction efficiency in the bonding between a heat pipe and a heat sink.

In order to achieve at least this object, according to the present invention, there is provided a heat discharger comprising a heat pipe and a heat sink formed separately from the heat pipe and bonded to the heat pipe via solder, wherein the contact surface portion between the heat pipe and the solder and the contact surface portion between the heat sink and the solder are made of a wettable material having a wettablility such that the contacting angle with respect to the solder is 90 degrees or less.

According to another aspect of the present invention, it is preferable that, in the heat discharger, the contact surface portions between the heat pipe and the solder and between the heat sink and the solder are formed by a coating which is made of the wettable material.

According to yet another aspect of the present invention, it is preferable that, in the heat discharger, only the contact surface portion is made of the wettable material in the heat pipe, while the heat sink is made entirely of the wettable material.

According to a further aspect of the present invention, it is preferable that, in the heat discharger, the wettable material includes at least one of copper, tin, and nickel.

According to still another aspect of the present invention, it is preferable that, in the heat discharger, penetrating holes are provided in a direction perpendicular to the contact surface portion.

According to another aspect of the present invention, it is preferable that, in the heat discharger, the ratio between the thickness of the heat sink and the wall thickness of the heat pipe is 2.5 or greater.

According to another aspect of the present invention, it is preferable that, in the heat discharger, the contact surface portions between the heat pipe and the solder and between the heat sink and the solder have shapes that engage each other.

According to another aspect of the present invention, there is further provided a heat discharger comprising a heat pipe and a heat sink formed separately from the heat pipe and brazed to the heat pipe, wherein the heat pipe is thermally treated.

According to the present invention, the heat conduction efficiency and bonding strength can be simultaneously improved at the bonding between a heat sink and a heat pipe.

DESCRIPTION OF PREFERRED EMBODIMENTS

Embodiment 1

Figure 1:
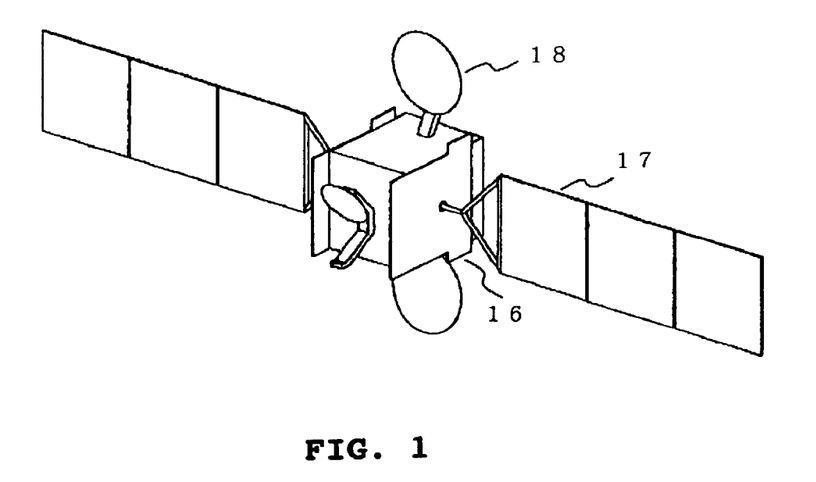
FIG. 1 is a schematic view showing a satellite to which the present invention is applied.

FIG. 1 shows a space satellite which comprises a container 16 in which electronic equipment for controlling the satellite are provided, a solar panel 17 for obtaining power by photoelectrically converting the sunlight, and an antenna 18 for transmitting electric waves to the earth.

Because the satellite must be lightweight and have high durability, a lightweight member is used which comprises a honeycomb structure in which a plurality of aluminum plates are formed with a predetermined gap to form a beehive-like structure. For the container 16, approximately 60 heat pipes are provided for heat conduction.

Figure 2:
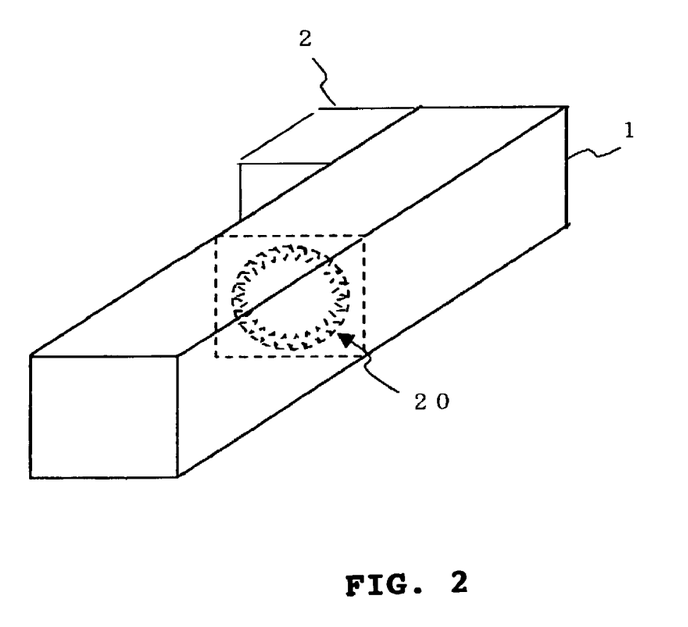
FIG. 2 is a schematic view showing a structure of a heat pipe.

As shown in FIG. 2, the heat pipe 1 is made of a hollow aluminum member with a cross section having a quadrilateral outer periphery and a circular inner periphery. In the heat pipe 1, a plurality of channels or "wicks" 20 are provided on the inner surface along the longitudinal direction of the heat pipe 1 in a predetermined space in between. Also, a heat sink 2 for discharging heat is provided on the outer side surface of and at one end of the heat pipe 1. In consideration of use in outer space, ammonia is sealed inside the heat pipe 1 in the present embodiment. This may not be the case in devices intended for use in other environments.

Figure 3:
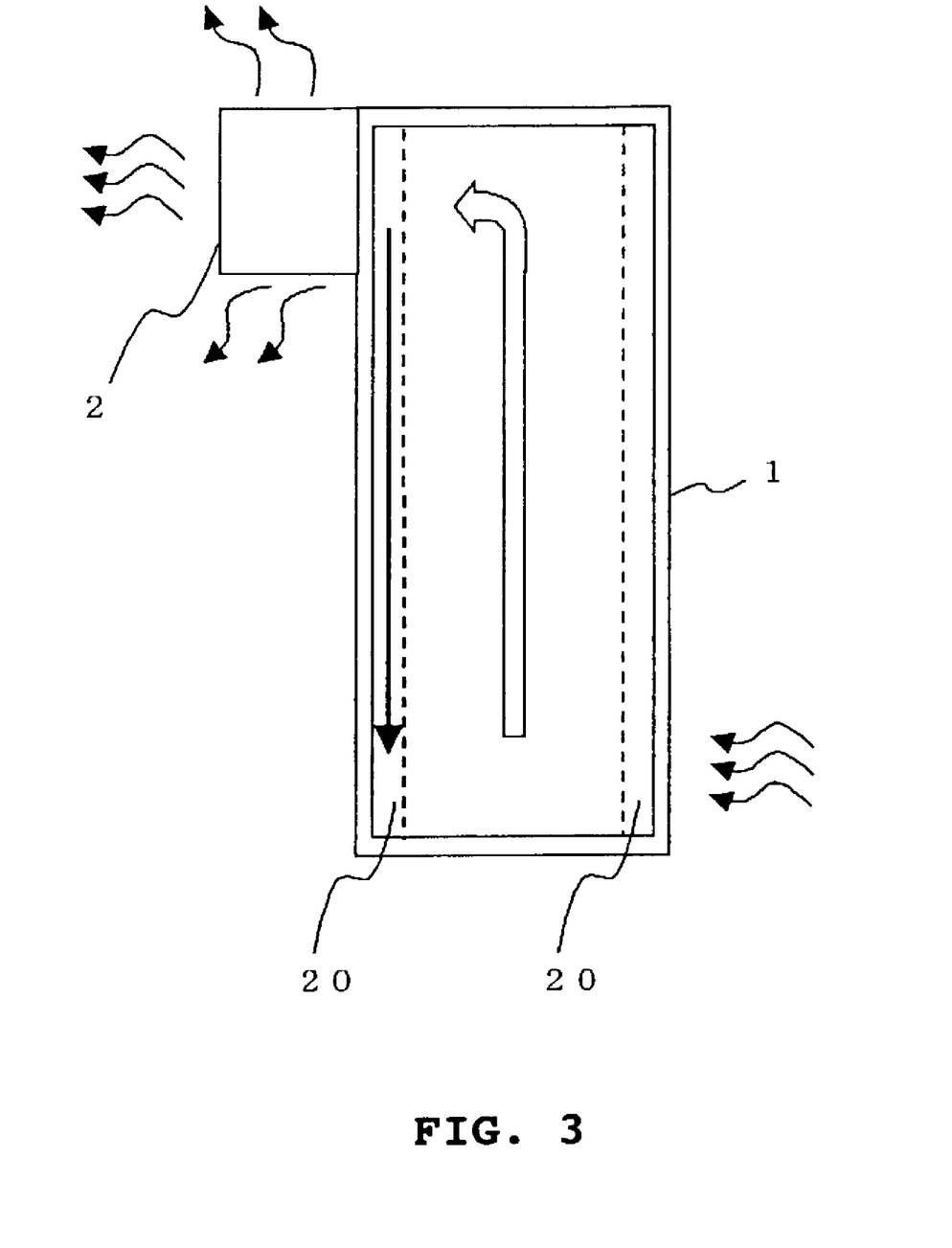
FIG. 3 is a schematic view for explaining a heat pipe.

As shown in FIG. 3, ammonia sealed in the heat pipe 1 is vaporized to absorb heat at one end of the heat pipe 1 which is heated. This ammonia flows to the other end which has a lower temperature and is liquefied on the inner surface of the other end, so that heat is discharged via the heat sink 2. The liquefied ammonia then flows towards the one end through the capillary action of the wicks 20 formed on the inner surface of the heat pipe 1. Therefore, the heat pipe is configured to conduct heat from one end to the other by ammonia circulating inside the heat pipe while absorbing and discharging heat.

Figure 4:
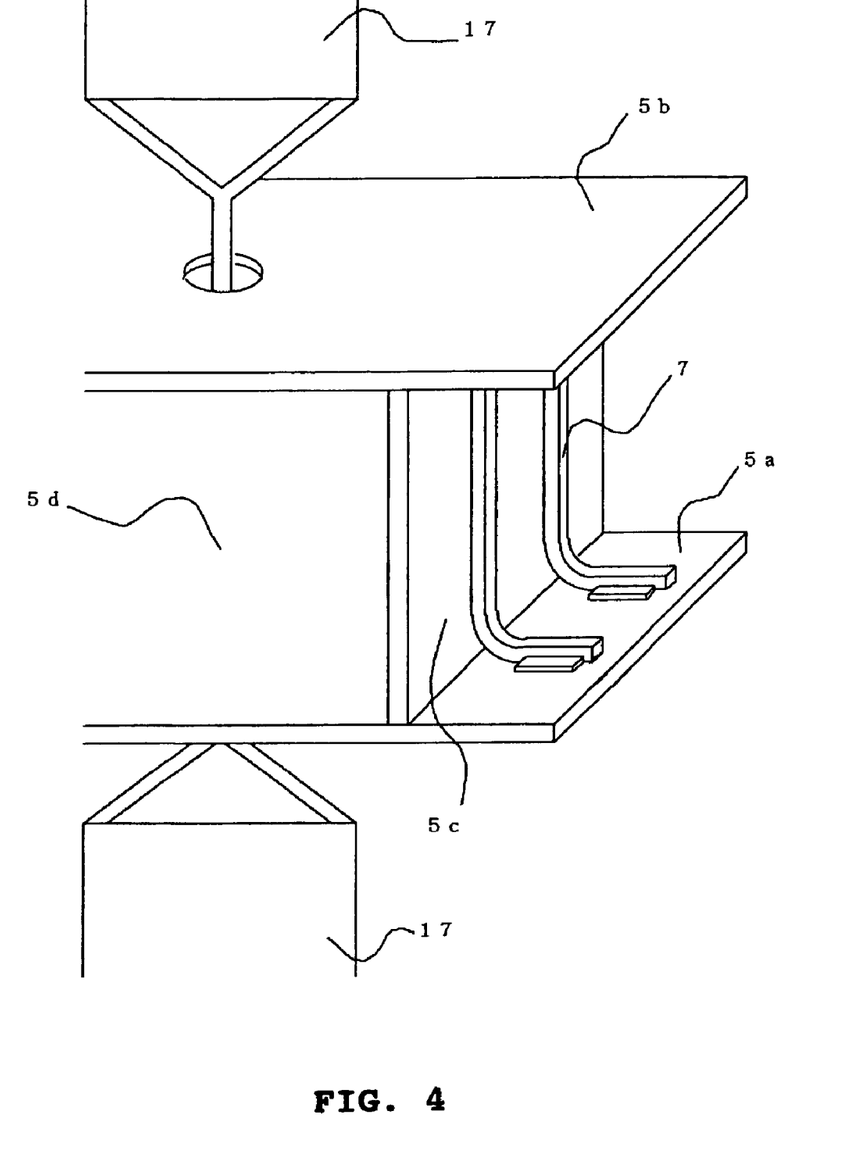
FIG. 4 is a schematic view showing an application example of the present invention.

FIG. 4 shows an example of the actual use of the heat pipe 1. As shown in FIG. 4, in some cases, a heat pipe 7 (hereinafter referred to as "connective heat pipe") may be mounted on panels 5a and 5b onto which solar panels 17 are mounted. The present embodiment will be described using this example.

Figure 5:
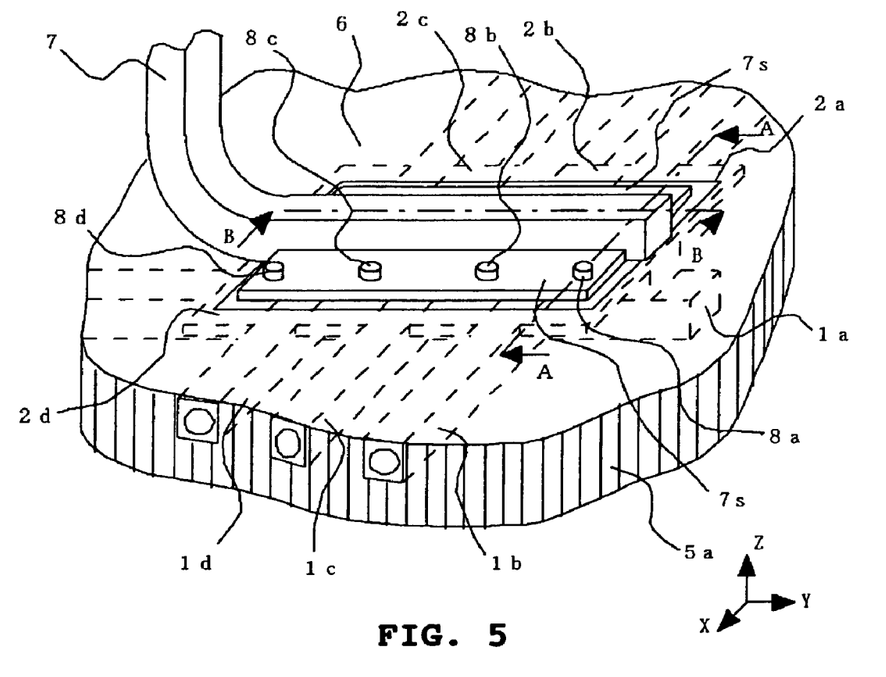
FIG. 5 is a schematic view enlarging the section for which the present invention is applied.
Figure 6:
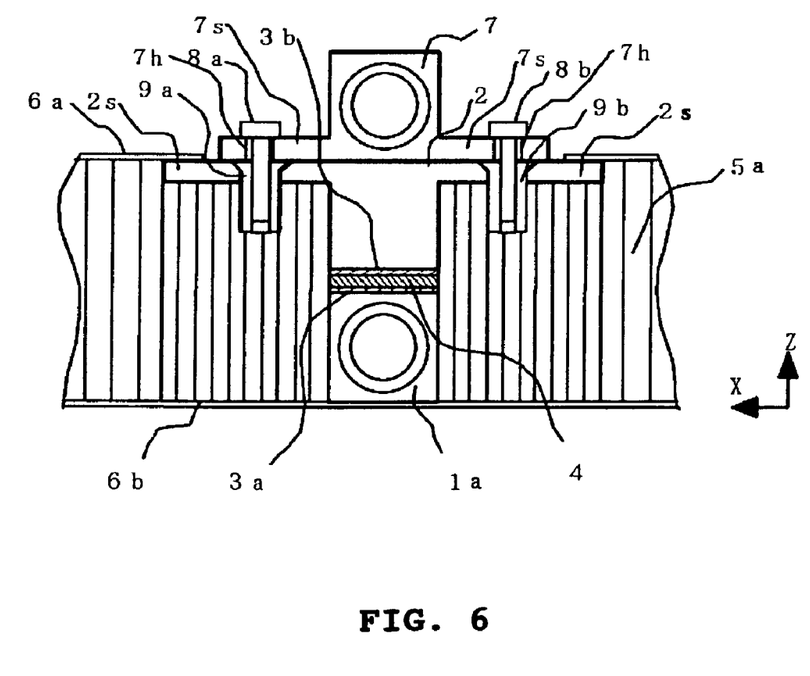
FIG. 6 is a first cross sectional diagram showing a first embodiment of the present invention.
Figure 7:
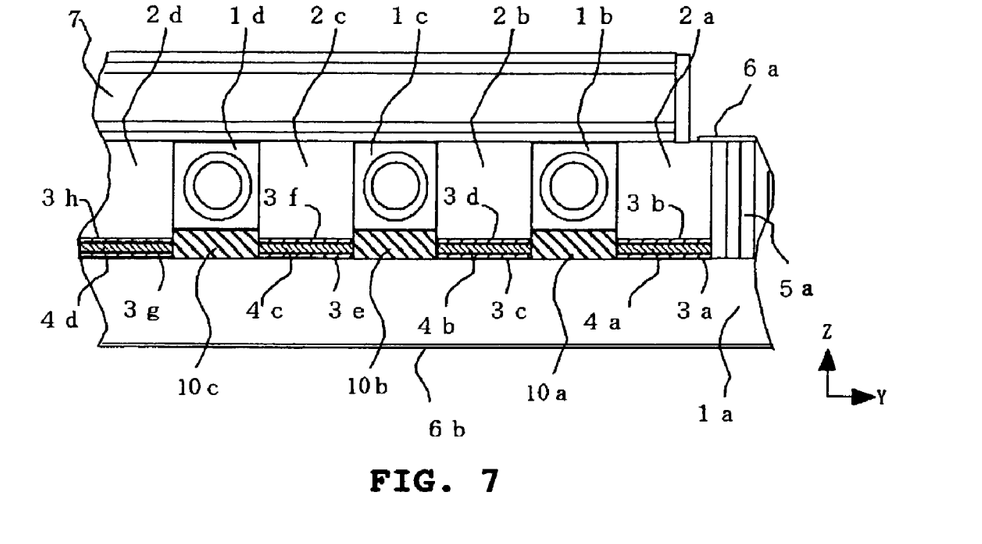
FIG. 7 is a second cross sectional diagram showing the first embodiment of the present invention.

FIG. 5 shows the connection between the connective heat pipe 7 and the panel 5a. In order to facilitate understanding, the cross sections for the connection between the connective heat pipe 7 and the panel 5a are shown in FIGS. 6 and 7, which respectively show the cross section along lines A—A and B—B in FIG. 5.

The panel 5a is a plate-like member in which aluminum plates are assembled in a honeycomb construction, and this plate-like member will hereinafter be referred to simply as the "honeycomb structure". Heat pipes 1 (1a~1d) and heat sinks 2 (2a~2d) are embedded in panel 5a, and face sheets 6a and 6d made of aluminum are provided on the honeycomb structure.

On the heat pipe 1a, heat sinks 2 (2a~2d) and heat pipes 1 (1b~1d) are provided in contact with the heat pipe 1a with the heat sink and heat pipe alternating as heat sink, heat pipe, heat sink, etc. The heat pipes 1b~1d are adhered to the heat pipe 1a perpendicular to the longitudinal direction of the heat pipe 1a using an adhesive 10 (10a, 10b, and 10c). As the adhesive 10, an adhesive material having a heat conductivity of, for example, approximately 1 [W/mK] can be preferably used.

The heat sink 2 is an aluminum member having a cross section of an approximately T-shape, and comprises a planer section having a widened portion and a main body section for supporting the planer section. The heat sink 2 is formed so that the length (y axis direction) and width (X axis direction) of the main body section have the same size as the length and width of the surface actually opposing the heat pipe 1a to which the heat sink 2 is adjacent within the honeycomb structure. At the ends of the planar section, fasteners 9 (9a and 9b) are provided at positions which are at a predetermined distance away from the central axis (y axis direction) of the planer section. The planer section is hereinafter referred to as "attachment support" 2s.

The face sheet 6a at the side on which the heat sink 2 is provided has rectangular openings on the surface opposing the attachment support 2s, and the fasteners 9 are exposed through the openings.

As shown in FIGS. 4 through 6, the connective heat pipe 7 is bent into a C-shaped structure along the wall surface constructed by sandwiching a panel 5c by panels 5a and 5b. On the surface of the connective heat pipe 7 which is in contact with the panel 5a, a plate-like member (hereinafter referred to as "attachment") 7s is integrally formed. At the ends of the attachment 7s, penetrating holes 7h are provided at positions which are at a predetermined distance away from the central axis of the attachment (y axis direction). The fasteners 9 of the attachment support 2s and the penetrating holes 7h of the attachment 7s are provided at corresponding positions.

The connective heat pipe 7 and the heat sink 2 are configured so that they are joined to each other by screws 8 (8a, 8b, 8c, and 8d) inserted through the penetrating holes 7h of the attachment 7s of the connective heat pipe 7, such that they join with the fasteners 9 of the attachment support 2s of the heat sink 2.

In addition, the connective heat pipe 7 is also directly joined to heat pipes 1b~1d which are in contact with the heat sinks 2a~2d. This structure allows heat to freely be conducted between the connective heat pipe 7, heat sinks 2a~2d, and heat pipes 1b~1d.

As described above, the heat sinks 2a~2d and the heat pipes 1b~1d are also connected to the heat pipe 1a. With such a structure, it is possible to allow heat to be freely conducted between the heat sinks 2a~2d and heat pipes 1b~1d and heat pipe 1a.

Therefore, the heat pipe 1a can receive heat which is conducted from the connective heat pipe 7 via the heat sinks 2a~2d and heat pipes 1b~1d or heat which is conducted from the heat pipes 1b~1d, and discharge the heat via the panel 5a. In this process, the heat sinks 2 also discharge a portion of the received heat.

Because a plurality of heat pipes 1a reprovided in combination, even if one of the heat pipes fails, heat can be conducted through the other heat pipes, and thus, the structure is internally redundant and highly resistant to failure.

As described, in an satellite, heat generated within the satellite is conducted between a plurality of heat pipes 1 (1a, 1b~1d) and heat sinks 2 which are joined, and is radiated into space. An example procedure for discharging, into space, the heat generated within the satellite will now be described.

A first example concerns a case in which one of the panels of the satellite is heated and the generated heat is radiated from another panel.

More specifically, when sunlight is incident on the panel 5a of the satellite, heat is accumulated in the panel 5a onto which the sunlight is incident, and a temperature difference is created between the panel 5a and another panel 5b. Therefore, in the satellite, the panel 5a becomes a high temperature portion and the panel 5b becomes a low temperature portion. The heat of the panel 5a is transmitted via the connective heat pipe 7 connected to both the heat pipes embedded within the panels 5a and the heat pipes embedded within the panel 5b, and then radiated into space from the panel 5b.

Figure 8:
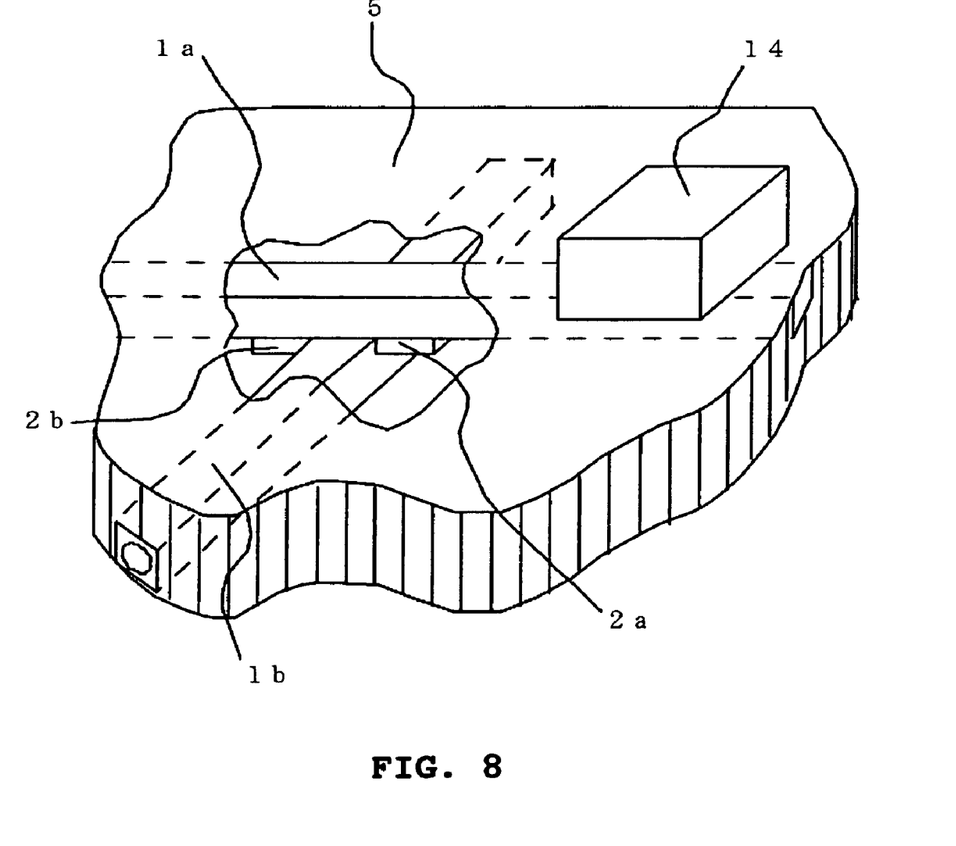
FIG. 8 is a schematic view showing a second example in which the present invention is applied.

A second example concerns a case as shown in FIG. 8 in which heat generated by electronic equipment 14 attached to a panel 5 is discharged from another panel.

More specifically, when the temperature of the panel 5 is higher than that of the connective heat pipe, the heat generated from the electronic equipment 14 is conducted through heat pipes embedded in the panel 5 (not shown) directly below the mounted electronic equipment 14 to the heat pipe 1a. A portion of the heat is further conducted to the connective heat pipe through the heat pipe 1b or the like and another portion of the heat is further conducted to the connective heat pipe through the heat sinks 2a, 2b, etc. Ultimately, the heat is discharged into the space from another panel provided at the side opposite that of the panel 5.

When, on the other hand, the temperature of the panel 5 is less than that of the connective heat pipe, the process is reversed. In other words, a portion of the heat transported by the connective heat pipe is transmitted to the heat pipes 1b, etc., and the remaining heat is transmitted to the heat pipe 1a via the heat sinks 2a, 2b, and etc., so that the heat is diffused in the panel 5 and radiated into space.

In such a structure, the heat pipe 1a and the heat sinks 2a~2d are bonded by a low temperature solder 4 (4a~4d). Moreover, copper coatings 3 (3a~3h) as a wettable material are formed on the contact surface between the heat pipe 1a and the low temperature solder 4 and on the contact surface between the heat sinks 2a~2d and the low temperature solder 4.

Figure 9:
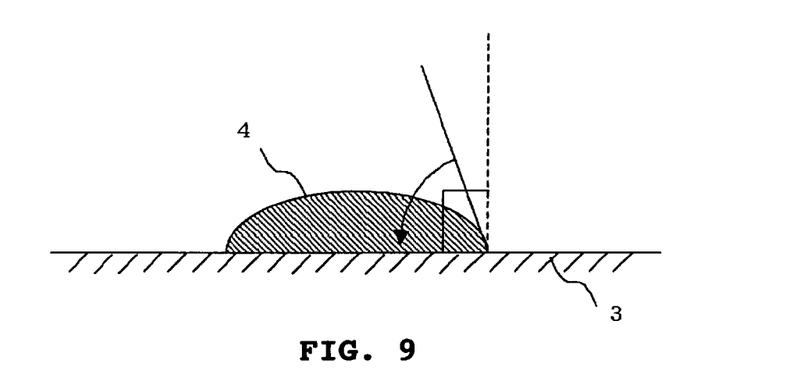
FIG. 9 is a schematic view for explaining the wettability of solder.

The copper coating 3 has good wettability with respect to the low temperature solder, and, as shown in FIG. 9, the contact angle with respect to the solder at the contact surface with the low temperature solder is 90 degrees or less. The copper coatings 3 are formed through a plating process.

Therefore, in the first embodiment, the heat pipe 1a and the heat sinks 2 are bonded by forming copper coatings 3 on the surfaces of the heat pipe 1a and of the heat sinks 2 that oppose each other when bonded (hereinafter, these surfaces are referred to as a "bonding surface") and uniformly distributing low temperature solder 4 on the bonding surfaces, so that the bonding surfaces can be bonded over the entire surface and the bonding strength (that is, the strength necessary to separate the bonded members) can be improved.

In the first embodiment, by forming copper coatings 3 on the bonding surface between the heat pipe 1a and heat sinks 2 and the low temperature solder 4, it is possible to prevent corrosion resulting from a potential difference between the aluminum heat pipe 1a or heat sinks 2 and the low temperature solder 4.

Furthermore, because the low temperature solder 4 is a lead-free solder (for example, having a composition of 96.5% tin and 3.5% silver) and melts at a temperature of approximately 220° C., the solder has a characteristic that it can be bonded at a temperature lower than a mid temperature solder or a high temperature solder.

On the other hand, the heat pipe 1a and heat sinks 2 which are made of aluminum and which are to be soldered by the low temperature solder 4 have a characteristic that when they are exposed to a high temperature such as 400° C. or higher, the heat pipe 1a and heat sinks 2 are annealed, and the strength rapidly falls to a strength corresponding to O condition (low strength material).

Therefore, in the first embodiment, by bonding the heat sinks 2 and the heat pipe 1a through low temperature solder 4, the heat sinks 2 and the heat pipe 1a can be bonded while maintaining the strength.

As a method for recovering the reduced strength of aluminum, for example, a method known as thermal treatment is sometimes employed. In this method, aluminum is rapidly heated to a temperature of approximately 520° C., rapidly cooled, and then heated for a predetermined amount of time at a temperature of approximately 180° C. However, when the strength between the heat pipe 1a and the heat sinks 2, reduced by the effects of soldering, is recovered through this method, there is a problem in that the soldered portions are damaged or destroyed by the heating, and therefore this thermal treatment cannot be used in conjunction with the present embodiment.

Also, the low temperature solder 4 has a thermal conductivity of 30~50 [W/mK] and has a characteristic that it can be drawn to a thickness of several tens of micrometers. Because of this, the thermal resistance at the bonding surface between the heat sinks 2a~2d and the heat pipe 1a is very small compared to the thermal conductivity of the adhesive as described above. The specific value for the thermal resistance is less than 0.03 [° C./W] per unit bonding area (1 cm$^2$), which is significantly small.

For example, even when an adhesive with good thermal conductivity (hereinafter referred to as "thermally conductive adhesive") is used, the actually measured value for the thermal conductivity of the thermally conductive adhesive is only about 1 [W/mK]. In addition, because such a thermally conductive adhesive has a high viscosity, it is difficult to draw the thermally conductive adhesive into a thin film. In fact, the thickness can be reduced only to approximately 0.2 [mm]. Therefore, the thermal resistance of the thermally conductive adhesive can be reduced only to approximately 2 [° C./W] per unit area (1 cm$^2$). If the thickness of the thermally conductive adhesive is greatly reduced, the bonding strength would be reduced.

Although, among adhesive materials, an epoxy-based adhesive which has a high bonding strength can be thinned to a thickness of approximately 0.1 [mm], the thermal conductivity of such adhesive is only approximately 0.2 [W/mK], and, thus, the thermal resistance is approximately 5° C./W per unit area (1 cm$^2$).

Therefore, in the first embodiment, by bonding the heat sinks 2 and the heat pipe 1a using the low temperature solder 4, it is possible to increase the bonding strength between the heat sinks 2 and the heat pipe 1a, and, at the same time, to decrease the thermal resistance.

In the first embodiment, because ammonia is used as an operational fluid for conducting heat in the heat pipes 1, the heat sinks 2 must be soldered to the heat pipe 1a before ammonia is sealed in the heat pipes 1.

Next, the thermal resistance and the bonding strength between the connective heat pipe 7 and the heat pipe 1a will be described.

As shown in FIG. 7, the thermal resistance between the connective heat pipe 7 and the heat pipe 1a comprises a first serially connected thermal resistance of the low temperature solder 4 and the heat sink 2 and second serially connected thermal resistance of heat pipe 1 and the adhesive 10, the first and second serially connected thermal resistances being connected in parallel.

With respect to the first serially connected thermal resistance of the low temperature solder 4 and the heat sink 2, because the heat sinks 2a~2d are made of aluminum which has a good thermal conductivity, for example, when the thickness is 15 [mm], the thermal resistance is 1 [° C./W] or less per unit area (1 cm$^2$). As described above, the thermal resistance of the low temperature solder 4 is less than 0.03 [ C./W]. On the other hand, with respect to the second serially connected thermal resistance of the heat pipes 1b~1d and the adhesive 10, the heat pipes 1 have a thermal resistance of approximately 3 times that of the heat sinks 2. As described above, the thermal resistance of the adhesive 10 is approximately 2 [° C./W].

In other words, although the first serially connected thermal resistance of the low temperature solder 4 and the heat sinks 2 differs from the second serially connected thermal resistance of the heat pipes 1b~1d and the adhesive 10, the value of the first serially connected thermal resistance of the low temperature solder 4 and the heat sinks 2 does not create any problems in practice. Because of this, the low temperature solder 4 and the heat sinks 2 can efficiently conduct heat received from the connective heat pipe 7 to the heat pipe 1a.

Moreover, because the heat sinks 2 and the heat pipes 1b~1d are directly connected, the heat conducted from the connective heat pipe 7 to the heat pipes 1b~1d is conducted to the heat sinks 2 which are connected to the heat pipes 1b~1d. With such a structure, it is possible to conduct, through the heat sinks 2, the portion of the heat which is not conducted through the heat pipe 1b~1d to the heat pipe 1a. The conducted heat can be discharged at the heat sinks 2.

Because the connective heat pipe 7 is only joined to the heat sinks 2, sufficient bonding strength is required between the connective heat pipe 7 and the heat pipe 1a. In other words, the configuration of the first embodiment results in a relatively heavy load being applied to the low temperature solder 4. Because of this, a thermally conductive adhesive can be used as the adhesive 10 for the junction between the heat pipe 1a and the heat pipes 1b~1d. With such a structure, the bonding between the connective heat pipe 7 and the heat pipe 1a has sufficient strength and sufficiently low thermal resistance.

Figure 10:
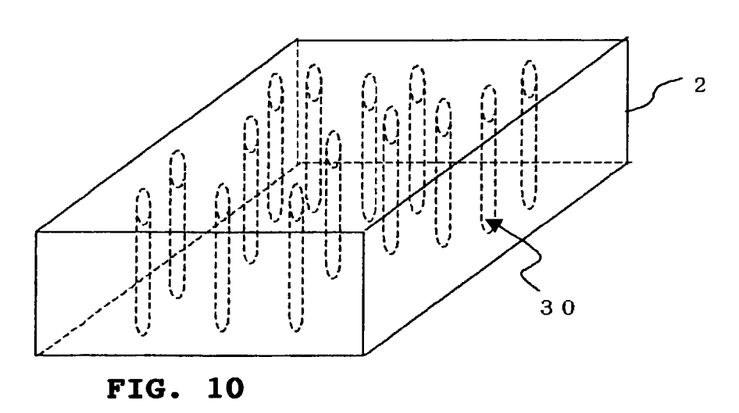
FIG. 10 is a schematic view showing a structure of a heat sink.

In addition, as shown in FIG. 10, a plurality of penetrating holes are formed as vent holes 30 in the heat sink 2 in a direction perpendicular to the surface onto which the copper coating 3 is formed. These vent holes 30 allow discharge of gas generated when the low temperature solder 4 is applied. In this manner, the vent holes 30 of the heat sink 2 prevent decrease in the bonding area, that is, decrease in the bonding strength, caused by accumulation of gas generated when the low temperature solder 4 is applied, around the bonding surface between the heat pipe 1a and the heat sinks 2.

In the first embodiment, in addition to the manufacturing conditions as described above, the bonding strength and the heat conductivity can be improved by optimizing other conditions such as, for example, the selection of an appropriate pasty solder, the amount of applied pasty solder, flux to be combined, soldering temperature and temperature raising rate when raising the temperature, heating method of the solder, thickness of the solder layer, type and thickness of pre-processing coating, fixing method during the soldering step of the heat pipe and heat sink, and gas removal method for efficiently removing flux which is gasified.

Experimental results of application of the first embodiment will now be described.

Figure 11:
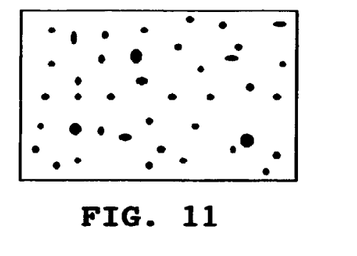
FIG. 11 is a schematic view showing a first image of the soldered portion captured through X ray imaging.
Figure 12:
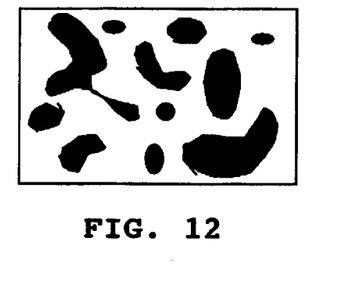
FIG. 12 is a schematic view showing a second image of the soldered portion captured through X ray imaging.

FIGS. 11 and 12 show states of soldering at the bonding section between the heat sink 2 and heat pipe 1a obtained by an X-ray analysis. FIG. 11 shows the state of soldering for a case wherein the heat sink 2 and the heat pipe 1a were bonded under the conditions described above. FIG. 12 shows the state of soldering for a case wherein the heat sink 2 and the heat pipe 1a were bonded under conditions different from those described above. In FIGS. 11 and 12, the white area represents the portion where the heat sink and the heat pipe were soldered and the black area represents the portion where the heat sink and the heat pipe were not soldered and a gap was created (this portion is hereinafter referred to as a "void").

As is clear from FIGS. 11 and 12, when the soldering was effected under desirable conditions, void generation at the bonding section between the heat sink 2 and the heat pipe 1a was inhibited, resulting in improvements in the bonding area between the heat sink 2 and the heat pipe 1a, in the bonding strength, and in the heat conduction.

Figure 13:
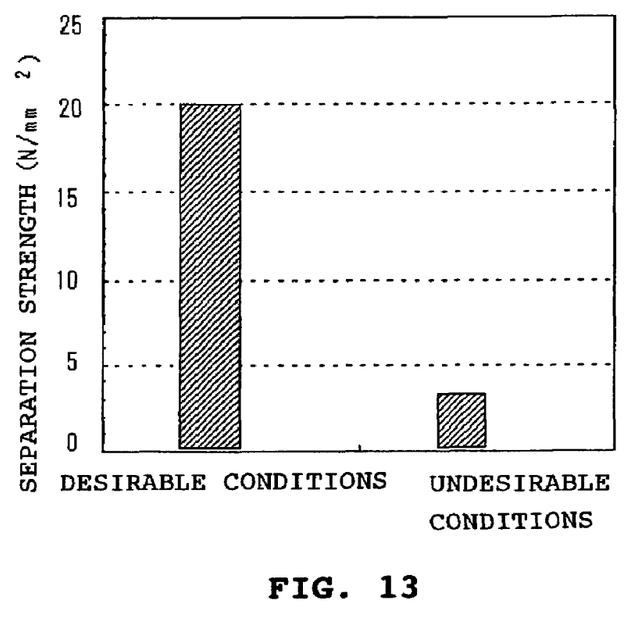
FIG. 13 is a graph showing the separation strength.

FIG. 13 shows the difference, in terms of the force required to separate the heat sink 2 and the heat pipe 1a, in the bonding strengths for cases where the heat sink 2 and the heat pipe 1a were bonded under desirable conditions and under other conditions. As shown in FIG. 13, when the heat sink 2 and the heat pipe 1a are bonded under desirable conditions, the separation strength is as much as 4 times the separation strength for the heat sink 2 and heat pipe 1a bonded under conditions other than the desirable conditions.

Figure 14:
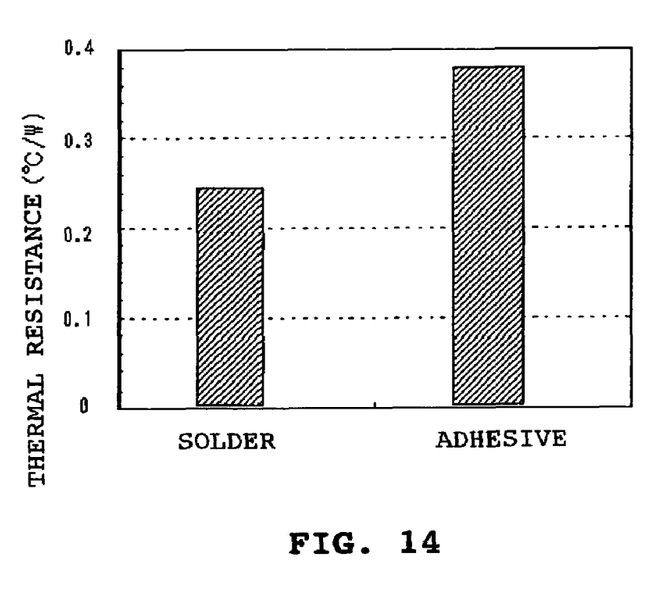
FIG. 14 is a graph showing the thermal resistance for cases where bonding is effected by a solder and by an adhesive.
Figure 15:
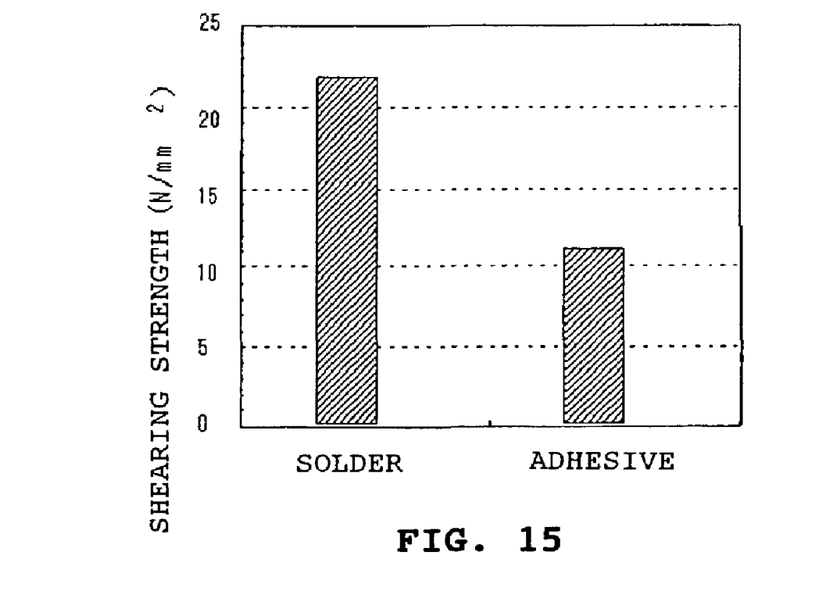
FIG. 15 is a graph showing the shearing strength for cases where bonding is effected by a solder and by an adhesive.

FIG. 14 shows the thermal resistance for cases where the heat sink 2 and the heat pipe 1a were soldered based on the first embodiment and where the heat sink 2 and the heat pipe 1a are bonded using an adhesive, and FIG. 15 shows the searing strengths for these two cases. In the experiments shown in FIG. 14, the overall thermal resistance from the heat sink surface to the heat pipe was considered.

As shown in FIG. 14, when the heat sink and the heat pipe were bonded using solder, the thermal resistance is reduced to approximately ⅔ of the thermal resistance in the case where the heat sink and the heat pipe were joined by an adhesive. Also, as shown in FIG. 15, when the heat sink and the heat pipe were bonded using solder, the mechanical strength was approximately twice that of the case where the heat sink and the heat pipe are joined by an adhesive.

The first embodiment is effective for cases where the thickness T1 of the heat sink is 2.5 times or greater than the wall thickness T2 of the heat pipe 1 (refer to FIG. 20), that is, when the wall thickness ratio between the heat sink 2 and the heat pipe 1 is 2.5 or greater. However, the first embodiment is not limited to such a case, and can be applied to cases where the wall thickness ratio between the heat sink 2 and the heat pipe 1 is less than 2.5 as long as the heat sink 2 and the heat pipe 1 are separately formed and then bonded together.

In the first embodiment, a plating process is described as an example in consideration of the contact between the film and the aluminum heat sink 2 and the aluminum heat pipe 1. However, other methods for forming a film can be used instead of the plating such as, for example, metallization or evaporation.

Moreover, although in the first embodiment, a case where copper coatings 3 are formed at the bonding surface between the heat pipe 1 and the heat sinks 2 before soldering is described, the coating can be made of other metals such as tin or nickel. Furthermore, the coating can also be made of a mixture of any two or more of copper, tin, and nickel.

In the example of the first embodiment, a lead-free solder is used in consideration of the environment, but a tin-lead-based solder (for example, having a composition of 50% tin and 50% lead) can also be used. The use of tin-lead-based solder (for example, having a composition of 50% tin and 50% lead) is more advantageous with respect to the thermal conductivity and the bonding strength between the heat pipe 1 and the heat sink 2, compared to the case where the lead-free solder is used.

Second Embodiment

Figure 16:
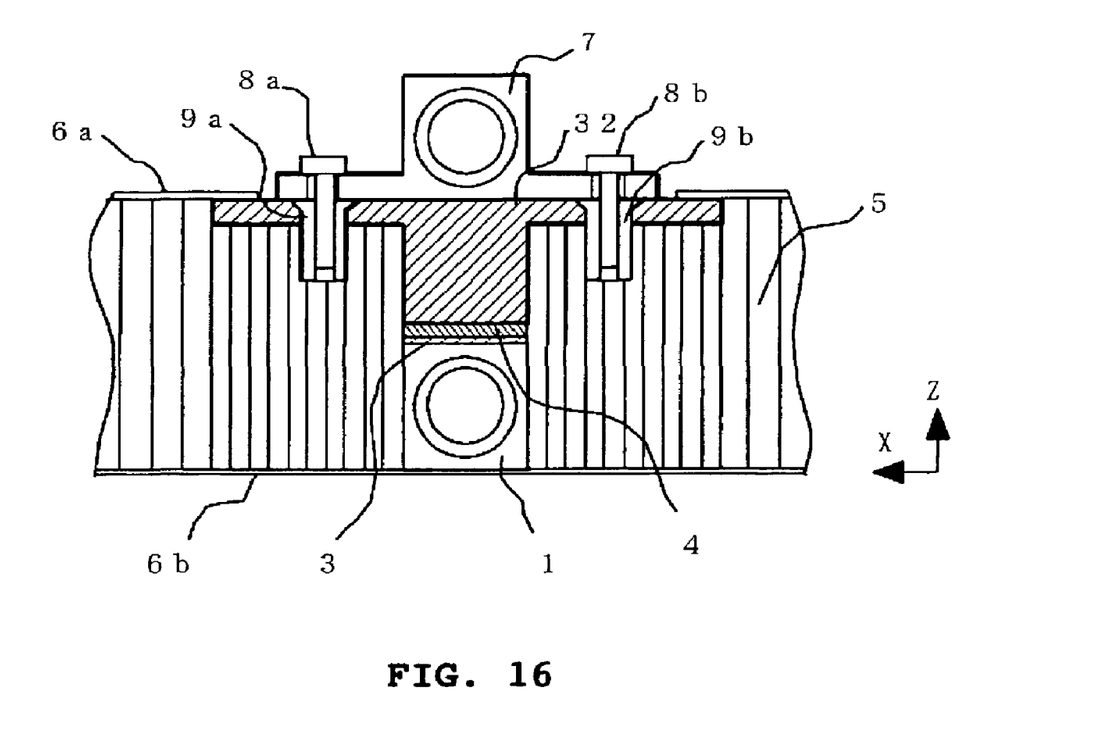
FIG. 16 is a cross sectional diagram showing a second embodiment according to the present invention.

FIG. 16 shows a heat pipe according to a second embodiment of the present invention. The second embodiment differs from the first embodiment in that the heat sink 32 itself is made of copper. In the following, elements identical to those described in the first embodiment are assigned the same reference numerals and will not be described again. In the second embodiment, because the heat sink 32 is made of copper, the process for forming the copper coatings 3 on the heat sink 2 as described in the first embodiment can be omitted. Moreover, there is no possibility of the vent holes 30 of the heat sink 2 being filled by the copper coatings 3.

Also, because copper has a thermal conductivity of 300 [W/mK] or greater, which is greater than the thermal conductivity of aluminum, the thermal resistance can be approximately halved by forming the heat sink 32 from copper rather than from aluminum.

Because the heat pipe 1 is made of aluminum in the second embodiment similar to the first embodiment, it is still preferable that a low temperature solder 4 be employed.

With the second embodiment, advantages similar to those in the first embodiment can be obtained.

Third Embodiment

Figure 17:
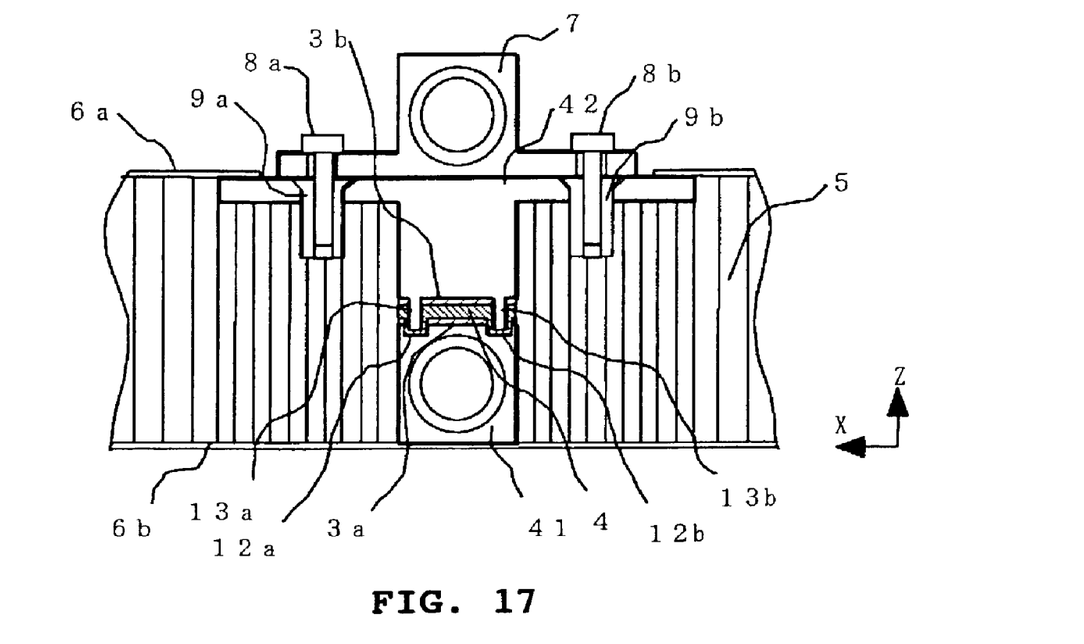
FIG. 17 is a cross sectional diagram showing a third embodiment according to the present invention.

FIG. 17 shows a heat pipe according to a third embodiment of the present invention. The third embodiment differs from the first embodiment in that channels 12a and 12b which constitute a first connection section and projections 13a and 13b which constitute a second connection section are respectively provided at the bonding surface of the heat pipe 1a and at the bonding surface of the heat sink 2. The channels 12a and 12b and the projections 13a and 13b are formed so that they can engage respectively. The elements identical to those in the first embodiment are assigned the same reference numerals and will not be described again.

In the third embodiment, heat pipe 1a and heat sink 2 can be easily positioned for soldering because of the engagement between the channel 12a and the projection 13a and between the channel 12b and the projection 13b.

In the third embodiment, an example is described in which the channels 12a and 12b are provided on the heat pipe 1a and projections 13a and 13b are provided on the heat sink 2. However, the configuration can also be reversed, that is the projections 13a and 13b can be provided on the heat pipe 1 and the channels 12a and 12b can be provided on the heat sink 2.

Moreover, although in the third embodiment, an example is described wherein two channels 12 and two projections 13 are provided, the present embodiment is not limited to such a case and the number of channels and corresponding projections can be different, such as, for example one, three, etc.

Furthermore, in the third embodiment, channels 12 and projections 13 are provided on the heat sink 2 and the heat pipe 1 described in the first embodiment. The channels 12 and projections 13 may also be provided on the heat sink 32 and the heat pipe 1 described in the second embodiment.

With the third embodiment, advantages similar to those in the first embodiment can be obtained.

Fourth Embodiment

Figure 18:
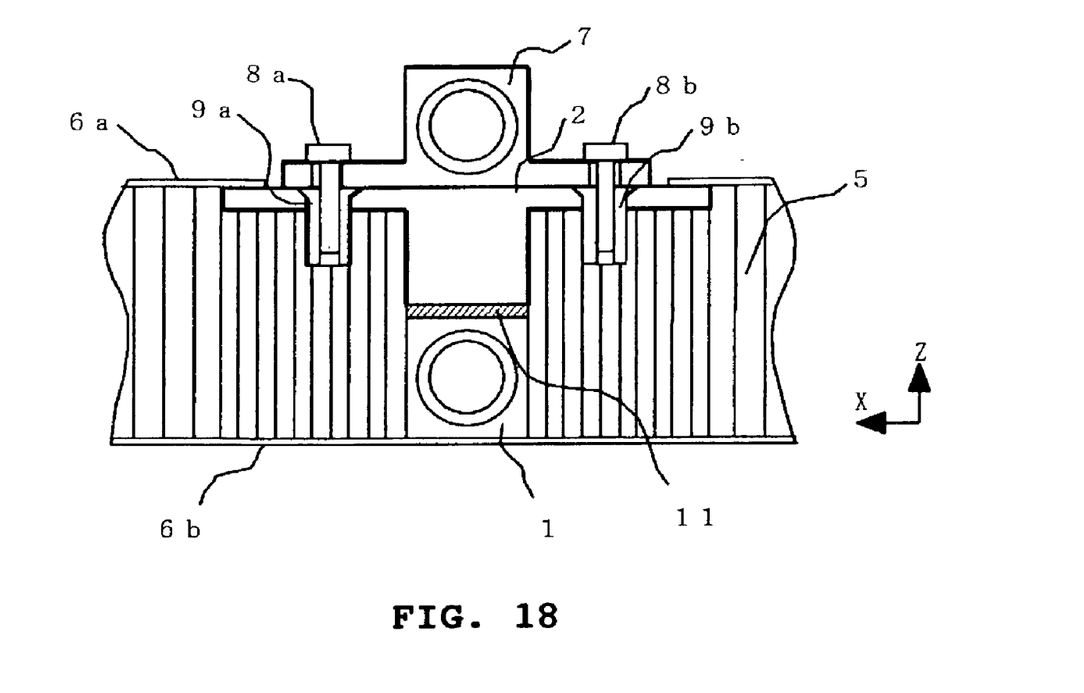
FIG. 18 is a cross sectional diagram showing a fourth embodiment according to the present invention.

FIG. 18 shows a heat pipe according to a fourth embodiment of the present invention. The fourth embodiment differs from the first embodiment in that a heat sink 42 and a heat pipe 41 are made of thermally treated aluminum and are brazed together via an aluminum brazing sheet 11. Because the bonding between the heat sink 42 and the heat pipe 41 are effected by brazing, no copper coating is required.

That is, even when the heat sink 42 and the heat pipe 41 which are made of thermally treated aluminum are brazed at a high temperature exceeding 600 [° C.], because the brazing temperature is higher than the temperature for the solution treatment, the strength can be recovered through the solution treatment and the age hardening treatment without the possibility of re-melting, and thus, strength degradation of the heat pipe material can be avoided.

Figure 19:
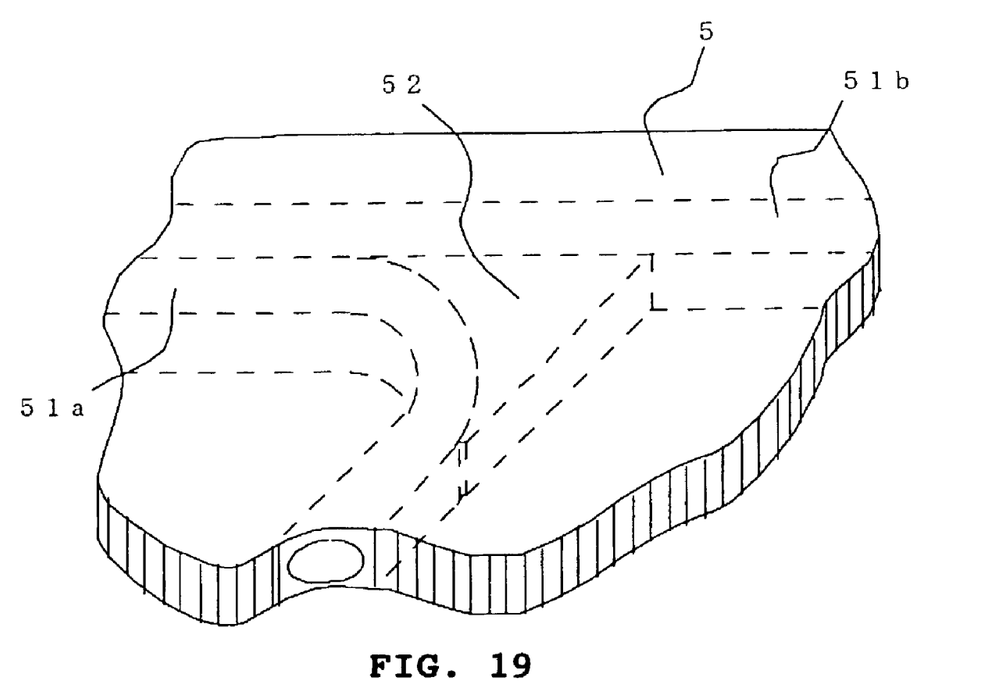
FIG. 19 is a schematic view showing another embodiment.

In the above embodiments, examples are described wherein the heat sinks 2 are provided between the heat pipe 1a and the heat pipes 1b~1d, and the heat sinks 2 and the heat pipe 1a are bonded. In the present embodiment, as shown in FIG. 19, it is also possible to provide and bond a heat sink 52 at a branching point of heat pipes 51a and 51b, each having a portion bonded together.

In the above embodiments, examples are shown wherein the heat discharger is used for heat pipes installed in a space satellite, but, and especially with the present embodiment, the heat discharger can also be used for heat pipes used for computers or machine tools used on earth. In particular, the present invention is effective when used in machines, such as, for example, a large machine tool, in which significant vibration generated during operation.

What is claimed is:

1. A heat discharger comprising:
   a heat pipe; and
   a heat sink formed separately from the heat pipe and bonded to the heat pipe via a solder, wherein
   a contact surface portion between the heat pipe and the solder and a contact surface portion between the heat sink and the solder each being made of a wettable material having a wettability such that the contacting angle between each of the contact surface portions and the solder is 90 degrees or less.

2. A heat discharger according to claim 1, wherein the contact surface portions between the heat pipe and the solder and between the heat sink and the solder are formed by a coating which is made of the wettable material.

3. A heat discharger according to claim 1, wherein
   in the heat pipe, only the contact surface portion is made of the wettable material; and
   the heat sink is made entirely of the wettable material.

4. A heat discharger according to claim 1, wherein the wettable material includes at least one of copper, tin, and nickel.

5. A heat discharger according to claim 1, wherein penetrating holes are provided in the heat sink in a direction perpendicular to the contact surface portion.

6. A heat discharger according to claim 1, wherein the ratio between the thickness of the heat sink and the wall thickness of the heat pipe is 2.5 or greater.

7. A heat discharger according to claim 1, wherein the solder is a low temperature solder.

8. A heat discharger according to claim 1, wherein the solder melts at a temperature of approximately 200° C.

* * * * *